United States Patent Office 3,314,950
Patented Apr. 18, 1967

3,314,950
2 - ALKYLIDENEAMINO - 2H - 1,2,4 - BENZOTHIA-
DIAZINE 1,1-DIOXIDES AND RELATED COM-
POUNDS
Peter H. L. Wei, Upper Darby, and Stanley C. Bell,
Philadelphia, Pa., assignors to American Home Prod-
ucts Corporation, New York, N.Y., a corporation of
Delaware
No Drawing. Filed Feb. 14, 1964, Ser. No. 344,830
5 Claims. (Cl. 260—243)

This invention relates to compositions of matter classi-
fied in the art of chemistry as substituted benzothiadia-
zines.

The invention sought to be patented in its principal
composition aspect resides in the concept of a composi-
tion of matter being a chemical compound having a molec-
ular structure in which there is attached to the 2-posi-
tion of the 2H-1,2,4-benzothiadiazine 1,1-dioxide nucleus
an ethylideneamino group or its hereinafter disclosed
equivalents.

The tangible embodiments of the principal composition
aspect of the invention possess the inherent general phys-
ical properties of being relatively high melting crystalline
solids; are substantially insoluble in water and are soluble
in polar solvents, such as lower aliphatic alcohols. Ex-
amination of the compounds produced according to the
hereinafter described process reveals, upon spectrographic
analysis, spectral data confirming the molecular structure
hereinbefore set forth. The aforementioned physical
characteristics taken together with the nature of the start-
ing materials and the mode of synthesis positively con-
firm the structure of the compositions sought to be pat-
ented.

The tangible embodiments of the principal composition
aspect of the invention possess the inherent applied use
characteristic of exerting qualitatively varying therapeu-
tic effects, as evidenced by pharmacological evaluation
according to standard procedures. These tangible em-
bodiments show central nervous system depressant effects.

The manner and process of making the invention will
now be generally described so as to enable a person
skilled in the art of chemistry to make the same.

The processes of the invention are illustrated schemati-
cable for specific embodiments thereof in Schemes A, C,
and E, below, and more generally in Schemes B, C, and F,
to which the numerals in parenthesis in the following de-
scription refer.

SCHEME A

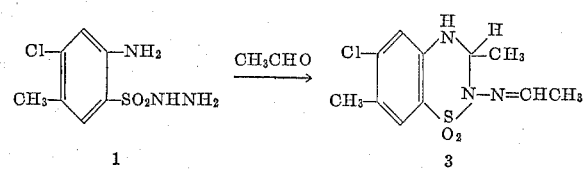

SCHEME B

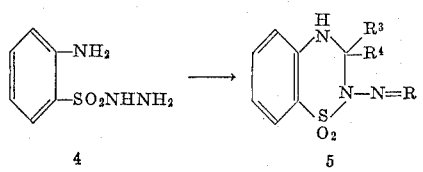

SCHEME C

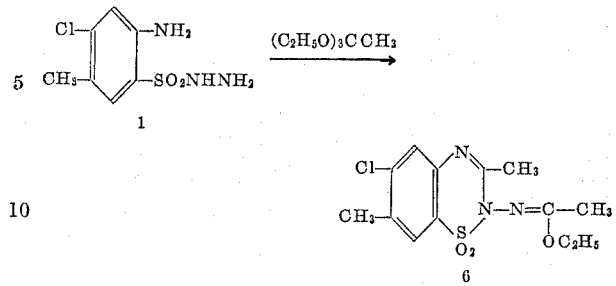

SCHEME D

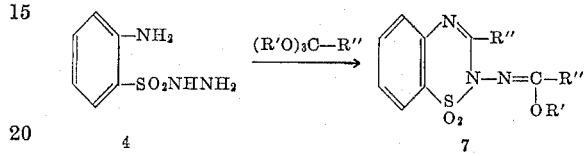

SCHEME E

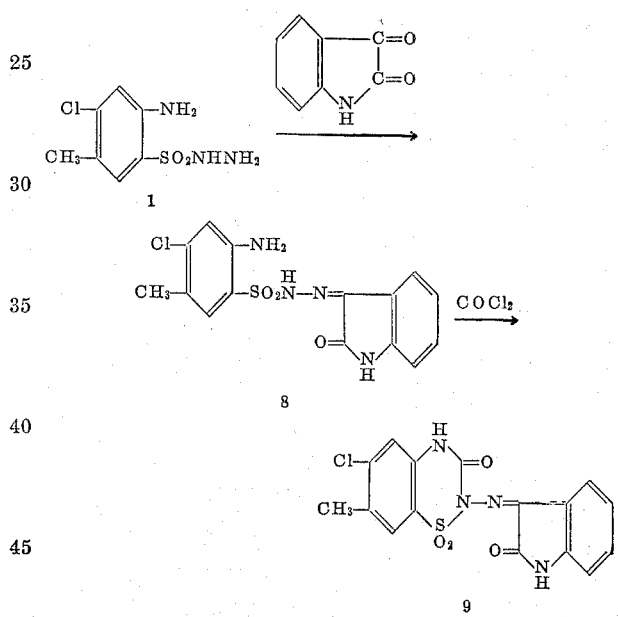

SCHEME F

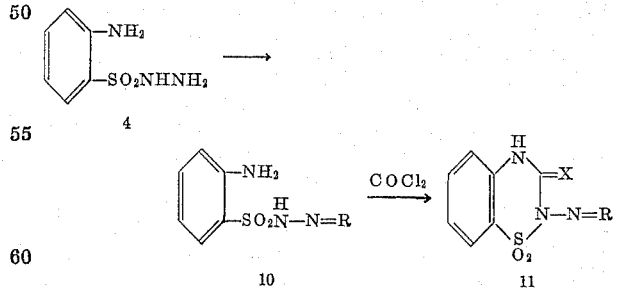

According to one procedure shown in Schemes A and
B, the physical embodiments of the present inventive con-
cepts are made by cyclizing with heat a phenylsulfonyl-
hydrazide (1)(4) and an aldehyde to form a 2-alkylidene-
amino-3,4-dihydro-(2H)-1,2,4 - benzothiadiazine 1,1 - di-
oxide (3)(5).

According to a second procedure shown in Schemes C
and D, the physical embodiments of the present inven-
tive concept are made by reacting a phenylsulfonylhydra-
zide (1)(4) with an alkylorthoacylate. This reaction preferably is carried out by heating the reactants in a lower alkanol solvent, and the resultant products have a 2-alkoxyalkylideneamino-2H-1,2,4-benzothiadiazine 1,1-dioxide structure (6)(7).

According to a third precedure shown in Schemes E and F, the physical embodiments of the present inventive concept are made by first reacting a phenylsulfonylhydrazide (1)(4) with isatin to form an isatin, 3-phenylsulfonylhydrazone (8)(10). This reaction is preferably carried out by heating the reactants in a lower alkanol solvent. The product so obtained then is cyclized in an inert solvent with phosgene to form a 2-(3-indolinylideneamino)-2H-1,2,4-benzothiadiazin-3(4H)-one 1,1-dioxide (9)(11). Equimolar amounts of reactants may be used but excess phosgene is preferred.

The substituted 2-aminophenylsulfonyl hydrazides and the isatin used in the above-described process are generally known or are readily prepared by procedures known to those skilled in the art. However, a recommended synthesis for the former is given hereinbelow in Example 1.

It will be apparent from the disclosure herein to those skilled in the art of organic chemistry that for the purposes of this invention, certain of the carbon atoms of the 2-amonophenylsulfonyl hydrazides employed as starting materials can be substituted with non-interfering groups. Therefore, in the process of the invention, all 2-aminophenylsulfonyl hydrazides can be employed in the process of making aspect of this invention to form compounds which are the full equivalents of the invention as particularly claimed. For example, but without limitation, either the 3,4, or the 5-position of the 2-aminophenylsulfonyl hydrazide starting compound (Formula I in Schemes A, C, E) can be substituted with an alkyl group such as methyl, ethyl, propyl, isopropyl and hexyl, a halogen atom such as chlorine, or a bromine atom, a haloalkyl group such as trifluoromethyl and dichloromethyl, a nitro group, or an alkoxy group such as methoxy, ethoxy, propoxy, butoxy, and pentoxy.

When the starting compounds are substituted as hereinbefore reacted, it will be apparent to those skilled in the art that the final products formed by the process of the invention will bear, correspondingly, the same substituents. Such substituted compounds are the full equivalents of the invention as particularly claimed.

The best mode contemplated by the inventors of carrying out their invention will now be set forth as follows:

Example 1.—*6-chloro-3,7-dimethyl-2-ethylideneamino-3,4-dihydro-2H-1,2,4-benzothiadiazine 1,1-dioxide*

A. *Preparation of starting material.*—Slowly add a dioxane solution of 19.2 g. (.08 m.) of 2-amino-4-chloro-5-methylbenzenesulfonyl chloride to a mixture of 30 g. (.5 m.) of an 85% hydrazine hydrate in water and dioxane, with stirring and cooling. Add enough dioxane to dissolve all the solids. Store the solution at room temperature overnight. Remove dioxane at reduced pressure. Collect and wash the white solids with water. Recrystallize from ethanol to obtain a pure material melting at 134–6° C. with decomposition.

B. *Preparation of final product.*—Add to 6.0 g. (.0254 m.) of 2-amino-4-chloro-5-methylbenzenesulfonylhydrazide, above prepared, in 50 cc. of ethanol 3.4 g. (.075 m.) of acetaldehyde. Treat the warm solution with Darco and cool. Recrystallize to obtain a light yellow material from ethanol (3.5 g.), M.P. 175–177° C.

When tested pharmacologically according to standard experimental procedures this compound exhibited central nervous system depressant activity.

The compositions constituting the invention can also be made according to the procedures hereinbefore set forth wherein substituents other than those hereinbefore enumerated are added to the benzothiadiazine nucleus. The toxicity of and the asserted activity of the composition so modified is not materially affected. Such additions to the benzothiadiazine nucleus are illustrated as follows:

Substituents R³ and R⁴ in Formula 5, Scheme B, can be alkyl having from 1 to 5 carbon atoms, haloalkyl of the same carbon content or phenyl or substituted phenyl. Substituent R' in Formula 7, Scheme D, can be hydrogen or an alkyl group having from one to five carbon atoms while R'' can be alkyl group having the previously indicated carbon content.

The 3-position (X) in Formula 11, Scheme F, can be substituted with an oxygen atom which may be converted to a sulfur atom, by heating with phosphorus pentasulfide. Substituents in the 2-position (Scheme F, R) can be an alkylidene group such as ethylidene and propylidene or an alkoxyalkylidene group such as ethoxyethylidene, an arylalkylidene group, such as phenylethylidene, cyclohexylidene or an indolinylidene group.

Such additions to the molecular structure of the inventive concepts herein described are fully equivalent to the subject matter particularly claimed.

The following examples illustrate the preparation of other compositions of the invention.

Example 2.—*6-chloro-3,7-dimethyl-2-ethoxyethylideneamino-2H-1,2,4-benzothiadiazine 1,1-dioxide*

Add 2-amino-4-chloro-5-methylphenylsulfonyl hydrazide (20 g. or .085 m.), gradually to 85 cc. of ethyl orthoacetate. Heat the mixture and distill the ethanol formed from the reaction. Cool and collect 21 g. of crude product. Recrystallize the material from benzene, M.P. 171–4° (dec.).

Example 3.—*Isatin, 3-(2-amino-4-chloro-5-methylphenylsulfonylhydrazone)*

Heat a mixture of 14.7 g. (.1 m.) of isatin and an equal molar quantity of 2-amino-4-chloro-5-methylphenylsulfonylhydrazine in ethanol on a steam bath for 10 min. Cool the mixture. Collect the yellow solids and wash with a small amount of ethanol. Recrystallize the crude material from a mixture of dimethoxyethane and methanol, M.P. 215–216° C.

Example 4.—*6-chloro - 7 - methyl-2-(2-oxo-3-indolinylidenamino)-2H-1,2,4-benzothiadiazin - 3(4H) - one 1,1-dioxide*

Add a phosgene solution (1.5 g. or .0152 m.) in dimethoxyethane to a solution of 3.65 g. (.01 m.) of isatin, 3-(2-amino-4-chloro - 5 - methylphenylsulfonylhydrazone), above prepared, in the same solvent. Reflux the mixture for 5½ hours. Collect the yellow solids and wash them with the same solvent to obtain a product weighing 1.1 g., M.P. 235° (d).

It will be apparent that the compounds of our invention may be made available in unit dosage forms, with the dosage adjusted for the respective activity of the particular compound, by admixing them with conventional excipients, extenders and the like.

Accordingly, the compounds of this invention can be administered with pharmaceutically acceptable inert carriers in a wide variety of oral or parenteral unit dosage forms containing 25, 100, 250 or 500 mg. of the active ingredients, or in admixture with other active compounds.

The subject matter which the applicants regard as their invention is particularly pointed out and distinctly claimed as follows:

1. A compound selected from the group consisting of those of the formula

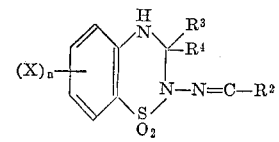

and

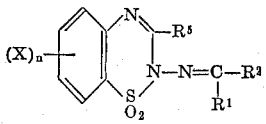

wherein R¹ is selected from the group consisting of hydrogen and alkoxy of less than six carbon atoms; R² is selected from the group consisting of lower alkyl and phenyl lower alkyl, and together with the carbon to which they are joined R¹ and R² is cyclohexylidene phenyl and indolinylidene; R³ is selected from the group consisting of hydrogen, alkyl of less than six carbon atoms and haloalkyl of less than six carbon atoms; R⁴ is selected from the group consisting of hydrogen, alkyl of less than six carbon atoms, haloalkyl of less than six carbon atoms, and phenyl, and together R³ and R⁴ is oxo (O=); R⁵ is selected from the group consisting of hydrogen and alkyl of less than six carbon atoms; X is selected from the group consisting of hydrogen, alkyl of less than six carbon atoms, chloro, bromo, trifluoromethyl, dichloromethyl, nitro and alkoxy of less than six carbon atoms; and $n$ is a positive integer less than four.

2. 6-chloro-3,7-dimethyl - 2 - ethoxyethylideneamino-2H-1,2,4-benzothiadiazine-1,1-dioxide.

3. 6-chloro - 7 - methyl-2-(2-oxo - 3 - indolinylideneamino)-2H-1,2,4-benzothiadiazin-3(4H)-one 1,1-dioxide.

4. 6-chloro-3,7-dimethyl - 2 - ethylideneamino-3,4-dihydro-2H-1,2,4-benzothiadiazine 1,1-dioxide.

5. Isatin, 3-(2-amino-4-chloro - 5 - methylphenylsulfonylhydrazone).

References Cited by the Examiner
UNITED STATES PATENTS 3,163,644    12/1964    De Stevens et al.    260—243

NICHOLAS S. RIZZO, *Primary Examiner.*